United States Patent [19]
Joseph

[11] Patent Number: 5,940,808
[45] Date of Patent: Aug. 17, 1999

[54] DISPLAY AGAINST INVENTORY VERIFICATION SYSTEM

[76] Inventor: Joseph Joseph, 470 Kents Ave., Queens, N.Y. 11211

[21] Appl. No.: 08/583,222

[22] Filed: Jan. 4, 1996

[51] Int. Cl.⁶ .................................................... G06F 17/60
[52] U.S. Cl. ............................................................. 705/28
[58] Field of Search .................................. 705/22, 28, 29

[56] References Cited

U.S. PATENT DOCUMENTS

| | | | |
|---|---|---|---|
| 3,593,008 | 7/1971 | De Witt et al. ........................ | 235/151 |
| 3,688,087 | 8/1972 | Howard et al. ..................... | 235/61.9 R |
| 4,323,771 | 4/1982 | Chalker, Jr. et al. ................... | 235/377 |
| 4,737,910 | 4/1988 | Kimbrow ................................ | 364/403 |
| 4,771,383 | 9/1988 | Takahashi ................................ | 705/28 |
| 4,814,592 | 3/1989 | Bradt et al. ............................. | 235/381 |
| 4,819,162 | 4/1989 | Webb, Jr. et al. ...................... | 364/401 |
| 5,212,635 | 5/1993 | Ferriter .................................... | 364/402 |
| 5,294,781 | 3/1994 | Takahashi et al. ...................... | 235/376 |
| 5,382,779 | 1/1995 | Gupta ....................................... | 235/383 |
| 5,434,394 | 7/1995 | Roach et al. ............................ | 235/375 |

FOREIGN PATENT DOCUMENTS 404243704  8/1992  Japan .
404243706  8/1992  Japan .

OTHER PUBLICATIONS

"Introducing the NCR 280 retail system", The Wall Street Journal, Sep. 17, 1970.

*Primary Examiner*—Edward R. Cosimano
*Attorney, Agent, or Firm*—David M. Klein; Shearman & Sterling

[57] ABSTRACT

A display against inventory verification apparatus and method that is operable to compare the display of items in a store to the inventory of the store to ensure that all items in inventory are on display and to ensure that all items on display are in inventory. Each item on display includes a bar code label and a bar code label reader is used to read and store all of the bar codes on display. A computer controller, which communicates with the bar code label reader compares the items on display with an inventory of the items for determining those items on display with inventory below a predetermined threshold. The computer controller also compares the items on display with an inventory of available items for determining those available items not on display. The computer generates reports of the items on display with inventory below the predetermined threshold and of the items available in inventory that are not on display.

16 Claims, 5 Drawing Sheets

FIG. 2

ID TAG DATABASE

| TAG NO. | SKU | DISPLAY-PRICE |
|---------|---------|---------------|
| 127963  | 3242861 | 49.99 |
| 241692  | 8132954 | 35.99 |

FIG. 3

SIZE DATABASE

| SKU | RECEIVE00 | • • • | RECEIVE14 | SOLD00 | • • • | SOLD14 |
|---------|-----------|-------|-----------|--------|-------|--------|
| 3242861 | 16        |       | 12        | 4      |       | 1      |
| 8132954 | 8         |       | 2         | 9      |       | 2      |

FIG. 4

| SKU | INVENTORY00 | • • • | INVENTORY14 |
|-----|-------------|-------|-------------|
|     |             |       |             |

FIG. 6

ITEMS IN INVENTORY BUT NOT ON DISPLAY

| SKU # | LOCATION | ON HD. | PRICE | DESC. | VEND STYLE | VENDOR NAME |
|---|---|---|---|---|---|---|
| 752-9936 | EE-52 | 13 | 26.99 | OUTBURST WHITE/BLUE 103005142 | 103005142 | NIKE, INC. |
| 755-0032 | DD-34 | 5 | 19.99 | TOPSPIN PLAYER BLACK 6451 | 6451 | L.A. GEAR, INC |
| 755-0076 | FF-13 | 5 | 39.99 | STADIUM COURT LO WHITE/TURQ/BL | 25555 | REEBOK INTERNATIONAL LTD. |

FIG. 7

ITEMS ON DISPLAY BUT NOT IN INVENTORY

| SKU # | LOCATION | OH HD. | PRICE | DESC. | VEND STYLE | VENDOR NAME |
|---|---|---|---|---|---|---|
| 641-0113 | G-41 | 1 | 29.99 | DAX NVY/BLK VR1004 | VR1004 | VANS |
| 648-0115 | J-39 | 1 | 39.99 | AIR TUMALO CHOCOLATE/BLK/FOG | 185034201 | NIKE, INC. |
| 751-9986 | TR-88 | 0 | 24.99 | RACER LEATHER WHITE 6042 | 6042 | L.A. GEAR, INC. |

DISPLAY AGAINST INVENTORY VERIFICATION SYSTEM

BACKGROUND OF THE INVENTION

1. Field of the Invention

The present invention relates generally to a display verification apparatus for a retail store or the like, and more particularly to an apparatus for comparing the items on display in a retail store to the store inventory to ensure that all items on display are in inventory, and that all items in inventory are on display.

2. Description of the Related Art

One common problem that is faced by retail stores, especially those such as shoe stores in which over 500 shoe and sneaker styles may be on display at any given time, is ensuring that all items that are on display are in the store's inventory. If displayed items are not in inventory, customer dissatisfaction and loss of sales may result.

An additional problem for retailers is ensuring that every shoe or sneaker style in inventory is on display. Generally speaking, the selling price for a shoe or sneaker design will be greatest when that style is new. If a style is in inventory but not on display, when the error is discovered and the item is eventually placed on display it may be at a lower selling price, thereby reducing the profitability on the item.

Conventionally, in order to check the display against inventory accuracy, a list of store inventory is printed and manually compared to the displays in the store. When hundreds of items are on display, this can be a costly and time consuming process. No technique is believed to exist for automating the display against inventory comparison process.

In the context of verification of shelf price labels, Gupta, U.S. Pat. No. 5,382,779, relates to a price verification method for retail stores in which shelf labels are provided with an extended bar code having an item number and price for the item. A remote scanner scans the item number and price and uses the item number to look up the item in a database which is identical to the store check-out scanner database. A comparison is made between the shelf price and the database price. If these prices are not the same, a new shelf label may be printed immediately.

It would be desirable to have a method of and apparatus for comparing the inventory of a retail store to the items on display in the store to ensure that all items in inventory are on display and to ensure that all items on display are in inventory.

SUMMARY OF THE INVENTION

The present invention is a display against inventory verification apparatus and method that is operable to compare the display of items in a store or the like to the inventory of the store to ensure that all items in inventory are on display and to ensure that all items on display are in inventory. The apparatus includes means for inputting an indication of the items on display in the store. In a preferred embodiment, each item includes a bar code label and the inputting means is a bar code label reader that reads and stores all of the bar codes on display.

The apparatus further includes a computer controller for comparing the items on display with the store inventory for determining those items on display with inventory below a predetermined threshold. First notification means, which is preferably a computer-generated report, generates a notification of the items on display with inventory below the predetermined threshold.

The computer controller also compares the items on display with an inventory of available items for determining those available items not on display. Second notification means, which is preferably a computer-generated report as well, generates a notification of available items not on display.

The bar code label reader is preferably hand-held and communicates the indication of the items on display to the computer controller.

A display against inventory verification method comprises the steps of:

inputting an indication of all items on display in a store;

comparing the items on display with an inventory of items for determining those items on display with inventory below a predetermined threshold;

generating a notification of items on display with inventory below the predetermined threshold;

comparing the items on display with an inventory of available items for determining those available items not on display; and generating a notification of available items not on display.

BRIEF DESCRIPTION OF THE DRAWINGS

FIG. 2 is a table showing the ID TAG database structure.

FIG. 3 is a table showing the SIZE database structure.

FIG. 4 is a table showing an alternative database structure.

FIG. 6 is a sample "Items in Inventory But Not on Display" report.

FIG. 7 is a sample "Items on Display But Not in Inventory" report.

DESCRIPTION OF THE INVENTION

The present invention will be described with respect to a display of shoes and/or sneakers in a retail store. It will be appreciated that the invention is applicable to any appropriate store display and to any other application in which it must be ensured that all items in inventory are displayed or otherwise placed in some appropriate location for access.

Figure 1:
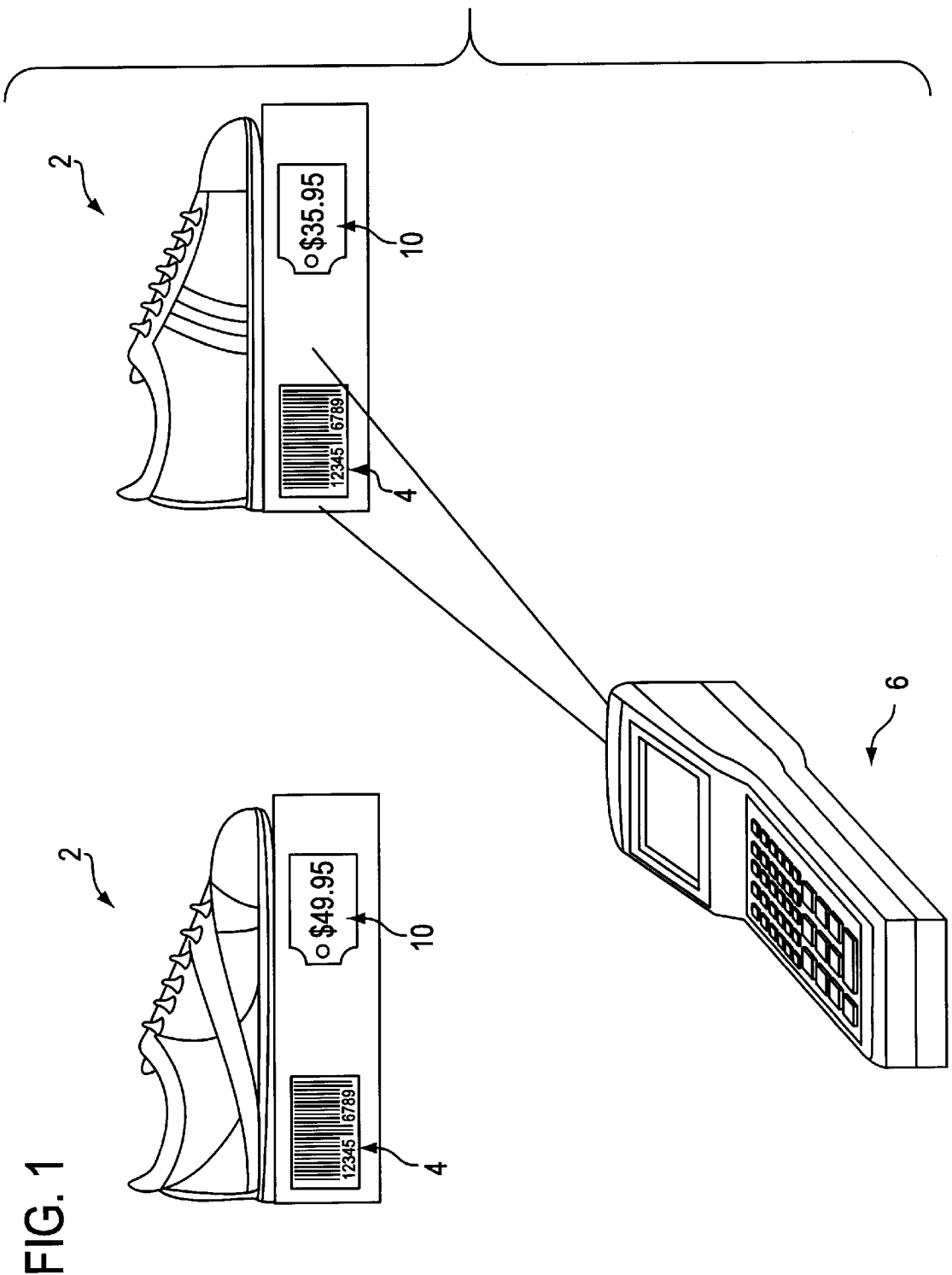
FIG. 1 is a perspective view showing the method of scanning display items of the invention.
Figure 5:
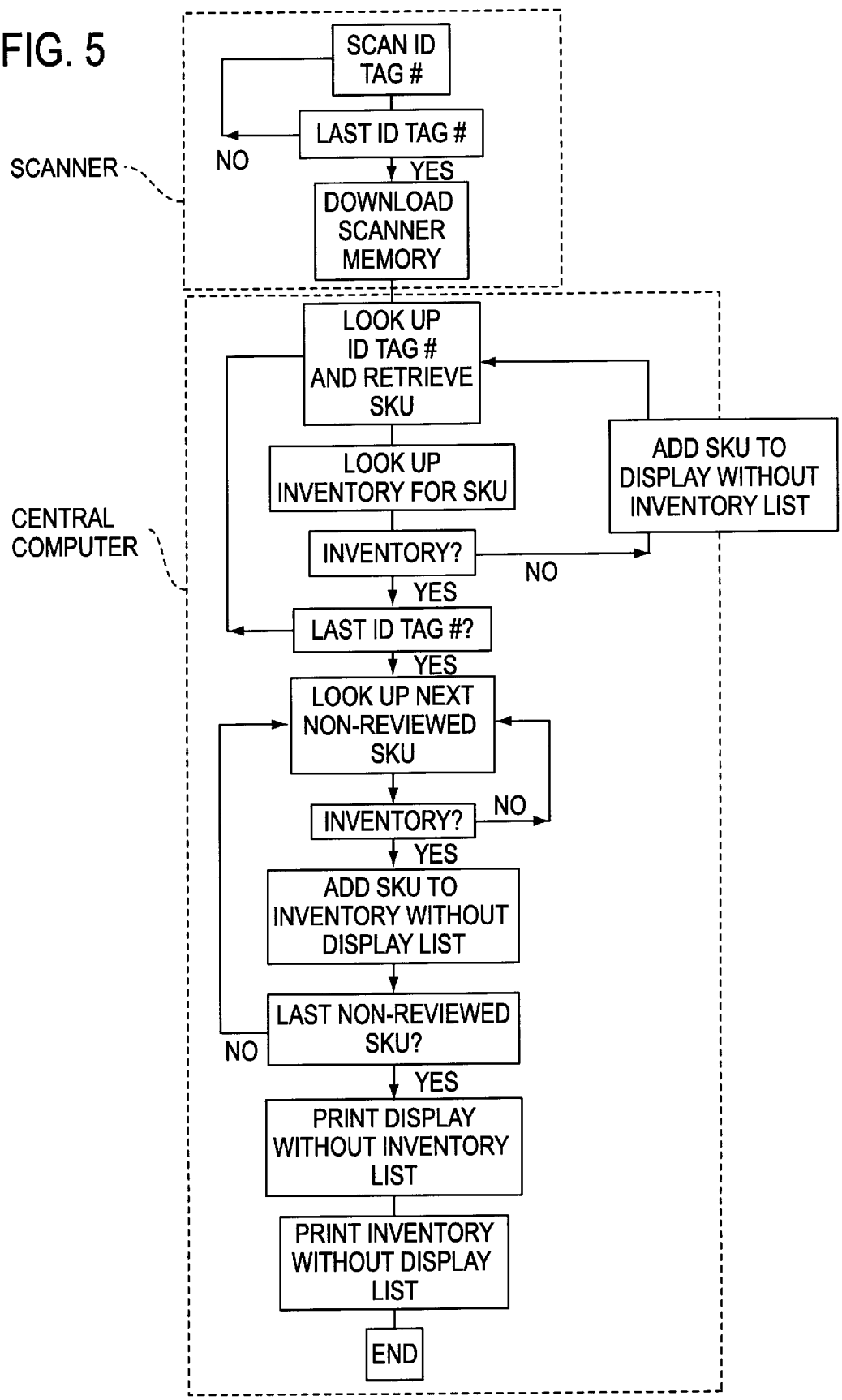
FIG. 5 is a flow diagram showing operation of the method and apparatus of the invention.

As shown in FIGS. 1 and 5, items such as sneakers 2, are on display in the store, with each item being identified by an identification tag that includes a bar code label 4 and a selling price 10.

Each bar code label 4 is preferably a conventional six-digit bar code of the type well-known in the art. A central computer for the retail store, preferably an IBM compatible computer running MS-DOS, employs a central database preferably programmed in FoxPro. As shown in FIG. 2, the central database includes an ID TAG database which has fields for TAG NO., SKU, and DISPLAY PRICE. As shown in FIG. 3, the central database also includes a SIZE database includes fields for SKU, RECEIVE00 . . . RECEIVE14, and SOLD00 . . . SOLD14, wherein 00 . . . 14 represent the sizes that are available for that SKU. It will be appreciated that sizes 00 . . . 14 are not literal sizes but are representative of actual sizes that may be determined from a further lookup table.

The SIZE database includes the inventory for each item in the store. The inventory for each size of each item may be determined by the looking up the SKU of the item and by subtracting the number of items sold for a particular size, e.g., SOLD00, from the number of items received for that size, e.g., RECEIVE00.

When it is desired to compare the items on display in the store to the inventory of the store, a hand-held scanner 6, preferably a Symbol Technologies PDT 3100 scanner is used to scan the bar code label for each item on display so as to read the TAG NO. Scanner 6 preferably includes a scanning head 8 which utilizes a light source to read each bar code label 4 and an internal memory for storing all of the TAG NOS. read by the scanner. In practice, a store employee will first scan the bar code label for each item on display. The TAG NOS. associated with these bar code labels are stored in the scanner memory until the entire scan of the floor display is complete. It is foreseen that, in lieu of using a bar code scanner, an indication of the items on display may be inputted by means of any appropriate data input device, such as a keyboard.

Once the scan has been completed, the content of the memory in scanner 6, i.e., the list of TAG NOS. for all items on display, is downloaded to the central computer by means of an RS232 connection between the scanner and the central computer. For each TAG NO. downloaded from the scanner, the computer accesses the ID TAG database and determines the SKU associated with that TAG NO. Using the 7-digit SKU, the computer accesses the SIZE database to determine whether there is inventory of that item. Ordinarily, if there are very few items, e.g., less than 1–3 pieces, of a particular SKU in store inventory, it will not be desirable to display that style because there will be little or no stock for any particular size of the item. A "Display Without Inventory" report is generated by the computer for items that are on display but for which there is little or no inventory. A typical report is shown in FIG. 6. A store manager, using this report, can then remove the displays for items with no inventory. If desired, the database can include information on the display location for the item and/or the stock location for the item. If the display location is printed on the "Display Without Inventory" report, the store manager will more easily be able to locate and remove the outdated displays.

Once all of the items on display have been compared against the SIZE database, the computer reviews all of the remaining SKU's in the SIZE database, i.e., all of the SKU's that were not on display, to determine whether there is sufficient inventory for any of these items to be displayed. The computer then generates a "Inventory Without Display" report for items in inventory that are not on display. An example of a report of this type is shown in FIG. 7. This report may include the stock location, if desired. The manager can then set up displays for those items that are in inventory but that are not on display.

Various modifications to the invention exist that are within the scope of the invention. For example, the scanner may be attached directly to a computer containing the SIZE and ID TAG databases so that as each bar code label is scanned, the computer can immediately notify the store personnel if the item on display is out of stock. Moreover, the database structure may be modified so that the bar code label for each item contains the SKU for that item, so that a relatively simple database (FIG. 4) which contains the SKU numbers and the amount of inventory for each SKU may be used to directly determine whether an item on display is in stock without the necessity of utilizing the ID TAG database. It will also be appreciated that the particular database structure described herein is not intended to limit the scope of the invention since other database structures may be implemented which perform functions identical to those described herein.

Although the present invention has been described in detail with respect to certain embodiments and examples, variations and modifications exist which are within the scope of the present invention as defined in the following claims.

I claim:

1. A display against inventory verification apparatus which comprises:

data-input means for inputting an indication of the identity of items on display;

an inventory database comprising an inventory of items and the stock of each such item; and a computer controller for receiving the indication of items on display from the data-input means, and for comparing the items on display with an inventory of the items in the inventory database for determining those items on display with inventory below a predetermined threshold and for generating a notification of items on display with inventory below the predetermined threshold, the computer controller further comparing the items on display with an inventory of available items for determining those available items not on display and generating a notification of available items not on display.

2. The display against inventory verification apparatus according to claim 1 wherein each item on display comprises a bar code for identifying the item, and wherein the data-input means comprises a bar code label reader.

3. The display against inventory verification apparatus according to claim 1 wherein the notification of items on display with inventory below the predetermined threshold comprises a report generated by the computer controller.

4. The display against inventory verification comprises according to claim 1 wherein each item on display comprises a bar code for identifying the item, wherein the data-input means comprises a bar code label reader, and wherein the bar code label reader communicates the indication to the computer controller.

5. The display against inventory verification apparatus according to claim 1 wherein the notification of available items not on display comprises a report generated by the computer controller.

6. The display against inventory verification apparatus according to claim 1 wherein the notification of available items not on display and the notification of items on display with inventory below the predetermined threshold are reports generated by the computer controller.

7. The display against inventory verification apparatus according to claim 6 wherein each item on display comprises a bar code for identifying the item, wherein the data-input means comprises a bar code label reader, and wherein the bar code label reader communicates the indication to the computer controller.

8. A display against inventory verification apparatus which comprises:

data-input means for inputting an indication of the identity of items on display;

an inventory database comprising an inventory of items and the stock of each such item:

a) a computer controller for receiving the indication of items on display from the data-input means, and for comparing the items on display with an inventory of the items in the inventory database for determining those items on display with inventory below a predetermined threshold, and for generating a notification of items on display with inventory below the predetermined threshold; or b) a computer controller for receiving the indication of items on display from the data-input means, and for comparing the items on display with an inventory of available items in the inventory database for determining those available items not on display, and for generating a notification of available items not on display.

9. The display against inventory verification apparatus according to claim 8 wherein each item on display comprises a bar code for identifying the item, and wherein the data-input means comprises a bar code label reader.

10. The display against inventory verification apparatus according to claim 9 wherein the notification of items on display with inventory below the predetermined threshold or the notification of available items not on display comprises a report generated by the computer controller.

11. The display against inventory verification apparatus according to claim 10 wherein each item on display comprises a bar code for identifying the item, wherein the data-input means comprises a bar code label reader, and wherein the bar code label reader communicates the indication to the computer controller.

12. A display against inventory verification method which comprises the steps of:

inputting an indication of the identity of all items on display into a data-input device; and a) automatically comparing the indication of items on display from the data-input device with an inventory of the items in an inventory database for determining those items on display with inventory below a predetermined threshold; and generating a notification of items on display with inventory below the predetermined threshold; or b) automatically comparing the indication of items on display from the data-input device with an inventory of available items in an inventory database for determining those available items not on display; and generating a notification of available items not on display.

13. The display against inventory verification method according to claim 12 which comprises the steps of:

automatically comparing the indication of items on display from the data-input device with an inventory of the items in an inventory database for determining those items on display with inventory below a predetermined threshold;

generating a notification of items on display with inventory below the predetermined threshold;

automatically comparing the indication of items on display from the data-input device with an inventory of available items in an inventory database for determining those available items not on display; and generating a notification of available items not on display.

14. The display against inventory verification method according to claim 13 wherein each item on display comprises a bar code for identifying the item and the data-input device comprises a bar-code scanner, and wherein the step of inputting an indication of items on display comprises scanning the bar code for each item using the bar-code scanner.

15. The display against inventory verification method according to claim 13 wherein the step of generating a notification of items on display with inventory below the predetermined threshold or the step of generating a notification of available items not on display comprises generating a report.

16. The display against inventory verification method according to claim 13 wherein each item on display comprises a bar code for identifying the item and the data-input device comprises a bar-code scanner, wherein the step of inputting an indication of items on display comprises reading each bar code label with the bar code scanner, and wherein the bar code scanner communicates the indication to a computer controller.

* * * * *